United States Patent
Krishnan et al.

(10) Patent No.: US 8,919,853 B2
(45) Date of Patent: Dec. 30, 2014

(54) INTEGRATED STEP AND GRAB-HANDLE SYSTEM FOR TAILGATES

(71) Applicant: Ford Global Technologies, LLC, Dearborn, MI (US)

(72) Inventors: Venkatesh Krishnan, Canton, MI (US); Bhupendra A. Patel, Canton, MI (US); David Manuel Rogers, Southfield, MI (US); Thomas M. Herline, Canton, MI (US); Marcus Edward Merideth, Westland, MI (US); Michael Bryan VanBelle, Canton, MI (US); Charles Gregory Bambenek, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/748,835

(22) Filed: Jan. 24, 2013

(65) Prior Publication Data
US 2014/0203587 A1 Jul. 24, 2014

(51) Int. Cl.
*B60R 3/02* (2006.01)
*B62D 33/03* (2006.01)
*B62D 33/027* (2006.01)

(52) U.S. Cl.
CPC . *B60R 3/02* (2013.01); *B62D 33/03* (2013.01); *B62D 33/0273* (2013.01)
USPC .......................... 296/62; 280/164.1; 296/1.02

(58) Field of Classification Search
CPC ............ B60R 3/00; B60R 3/007; B60R 3/02; B60R 3/005
USPC ...................... 296/1.02, 51, 62, 180.1, 181.5; 280/164.1
See application file for complete search history.

(56) References Cited

U.S. PATENT DOCUMENTS

| | | | |
|---|---|---|---|
| 4,639,032 A | 1/1987 | Barbour | |
| 5,205,603 A * | 4/1993 | Burdette, Jr. | 296/62 |
| 6,003,633 A * | 12/1999 | Rolson | 182/127 |
| 6,712,568 B2 | 3/2004 | Snyder et al. | |
| 6,857,680 B2 | 2/2005 | Fielding | |
| 6,905,158 B1 | 6/2005 | Bastian | |
| 6,918,624 B2 * | 7/2005 | Miller et al. | 296/62 |
| 7,029,138 B2 * | 4/2006 | Tibbenham et al. | 362/84 |
| 7,059,648 B2 * | 6/2006 | Livingston | 296/62 |
| 7,234,749 B1 | 6/2007 | Firzlaff et al. | |
| 7,287,798 B2 * | 10/2007 | King | 296/57.1 |
| 7,347,473 B2 | 3/2008 | Miller et al. | |
| 7,401,833 B2 | 7/2008 | Dryja | |
| 7,472,938 B2 | 1/2009 | Firzlaff et al. | |
| 7,488,021 B1 | 2/2009 | Roos et al. | |
| 7,530,619 B1 * | 5/2009 | Bruford et al. | 296/62 |
| 7,673,922 B1 * | 3/2010 | Grimes | 296/62 |
| 7,712,811 B2 * | 5/2010 | Heaman et al. | 296/26.08 |
| 7,834,750 B1 | 11/2010 | Hertz et al. | |
| 7,896,419 B2 | 3/2011 | Elliott et al. | |
| 2012/0126564 A1 | 5/2012 | Hausler et al. | |

* cited by examiner

*Primary Examiner* — Jason S Morrow
*Assistant Examiner* — E Turner Hicks
(74) *Attorney, Agent, or Firm* — Raymond L. Coppiellie; Brooks Kushman P.C.

(57) ABSTRACT

A deployable step and handle system for a tailgate. The handle is used to secure the deployable step in the stowed position that eliminates the need for a separate release system. The handle is placed adjacent a top edge of the tailgate to prevent debris from being trapped under the handle when the handle is closed. The ladder has a step surface disposed opposite and at an angle relative to a top surface of a spoiler that provides a step surface. The ladder rails are guided by rail guides as the ladder is moved between a stowed position and a deployed position. A unitary support bracket is used to connect both the handle and a ladder rail to the tailgate.

20 Claims, 4 Drawing Sheets

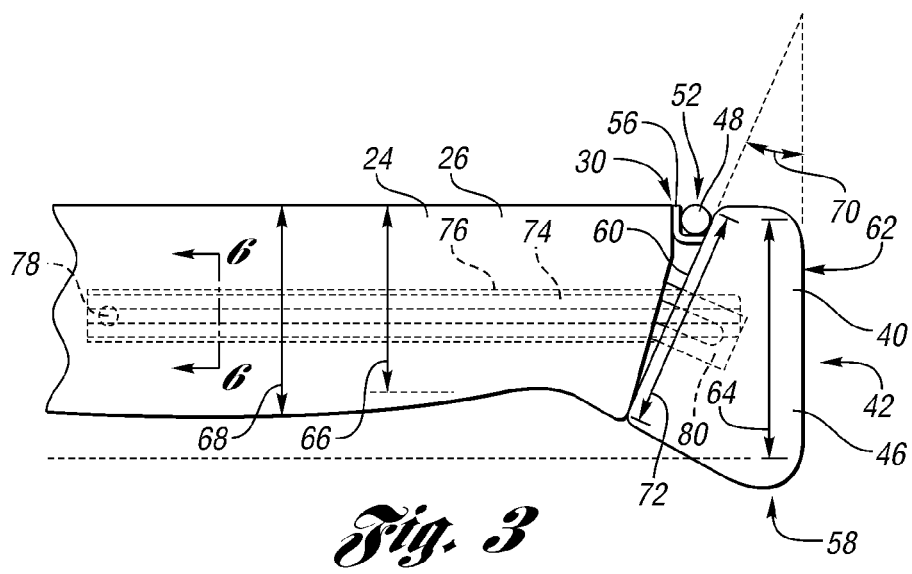
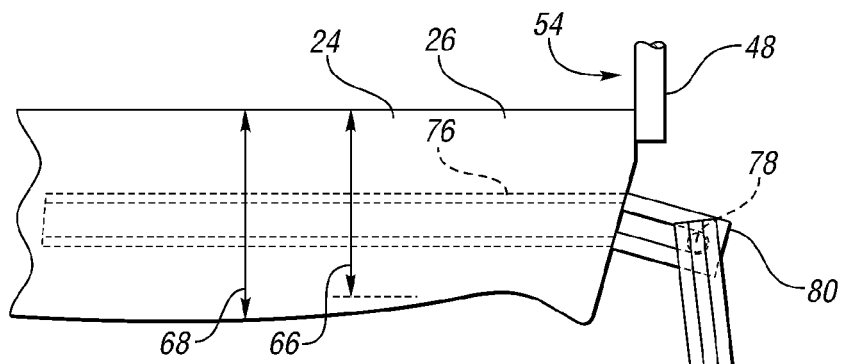
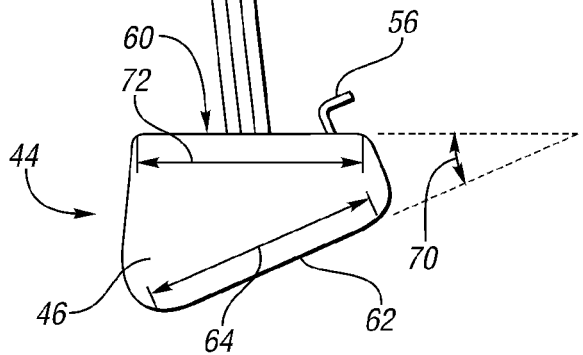

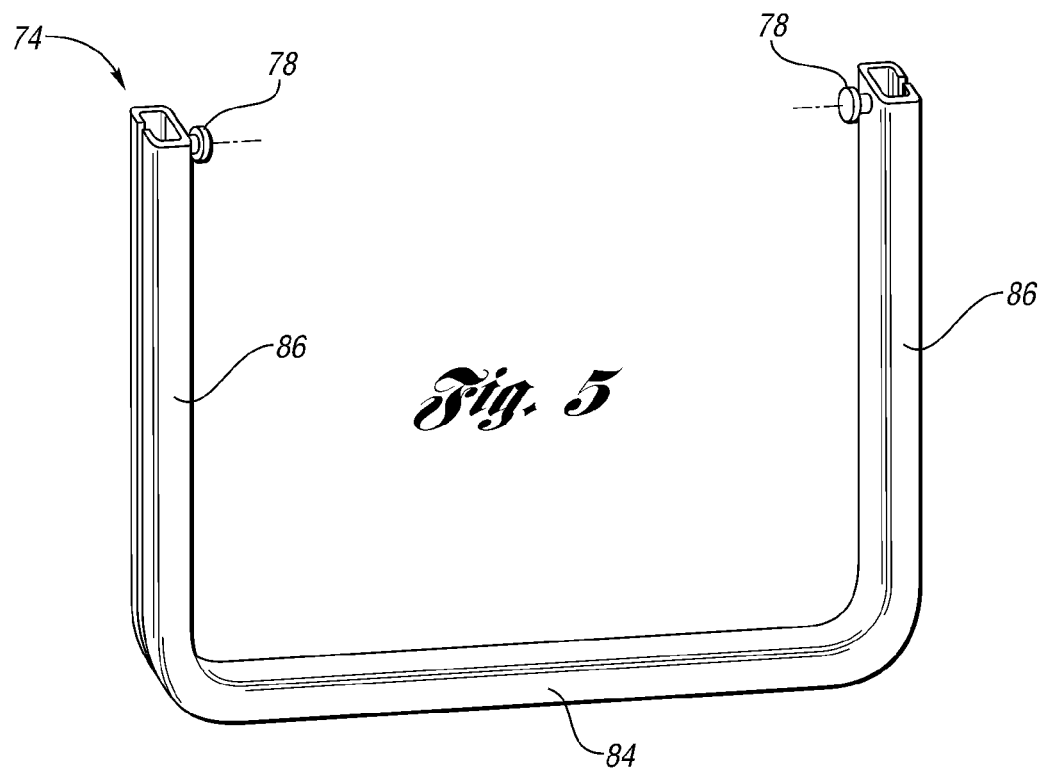
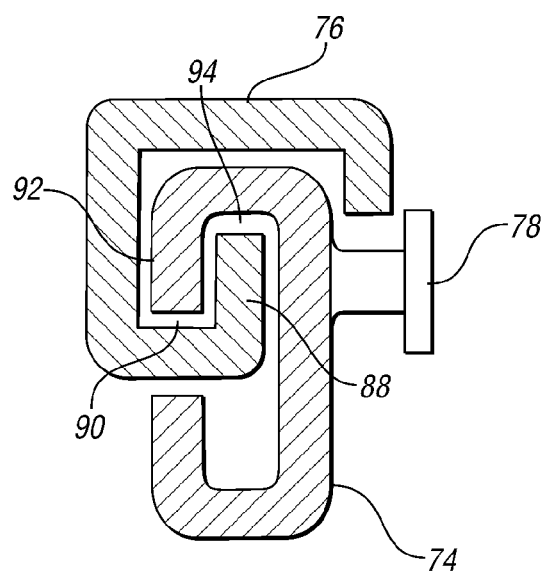

US 8,919,853 B2

INTEGRATED STEP AND GRAB-HANDLE SYSTEM FOR TAILGATES

TECHNICAL FIELD

This disclosure relates to a deployable step assembly housed within a tailgate of a vehicle used for accessing a cargo area on the vehicle.

BACKGROUND

Some vehicles such as station wagons, sport utility vehicles (SUV), vans, pickup trucks, flat-bed trucks, dump trucks, and the like, as well as certain kinds of trailers and wagons, have an access gate which is hinged at the bottom and opens to access a cargo area. Typically this door is located at the rear of the vehicle or trailer and is generally referred to as a tailgate.

In an effort to allow for easier access to the cargo area through an opened tailgate, steps or ladders may be used. Carrying extra steps or ladders in the vehicle takes away from the available cargo space of the cargo area. Vehicle step systems have been used, however, the step systems may not have been optimally located on the vehicle, may have been overly cumbersome in operation, may have caused rattles and other NVH concerns, may not have provided adequate support for the user, and loose cargo and debris may cause issues with the opening or closing of the step systems.

The above problem(s) and other problems are addressed by this disclosure as summarized below.

SUMMARY

In one aspect of this disclosure, a step assembly is disclosed that has a ladder partially disposed within a tailgate in a stowed position. The ladder may also be extended downwardly from the tailgate in to a deployed position. A handle connected to the tailgate has a first position securing the ladder in the stowed position and a second position extending upwardly from the tailgate for deploying the ladder.

According to another aspect of this disclosure, a step assembly is disclosed that has a rail guide disposed within and connected to a tailgate. The rail guide has a first flange and defines a first slot adjacent the first flange. A ladder has a rail that includes a second flange and defines a second slot adjacent the second flange. The second flange of the rail is disposed within the first slot of the rail guide to support the ladder in a stowed position. The second flange slides along the first slot as the ladder slides out to a deployed position.

According to yet another aspect of the disclosure, a tailgate is disclosed that has a main body section and two upper sections extending from the main body section. These two upper sections provide first and second portions of a spoiler. The main body section and the two upper sections cooperate to define a ladder pocket. A base of the ladder pocket is defined by the main body section and side walls of the ladder pocket. A ladder that has a step sub-assembly is selectively disposed in the ladder pocket. The step sub-assembly provides a third portion of the spoiler and is disposed between the first and second portions of the spoiler when the ladder is in a stowed position. The spoiler has a top surface with an average width greater than an average thickness of the main body section. The step sub-assembly has a step surface opposite and at an angle to the top surface. The step surface is disposed adjacent to the base of the ladder pocket when the ladder is in the stowed position. In this configuration, the step surface may be longer than the average width of the top surface of the spoiler.

BRIEF DESCRIPTION OF THE DRAWINGS

FIG. 3 is a diagrammatic side view of a tailgate with a ladder in a stowed position.

FIG. 4 is a diagrammatic side view of a tailgate with a ladder in a deployed position.

FIG. 5 is a perspective view of a ladder rail and pins.

FIG. 6 is a cross-sectional view taken through line 6-6 of FIG. 3 showing one embodiment of a rail guide supporting a ladder rail.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
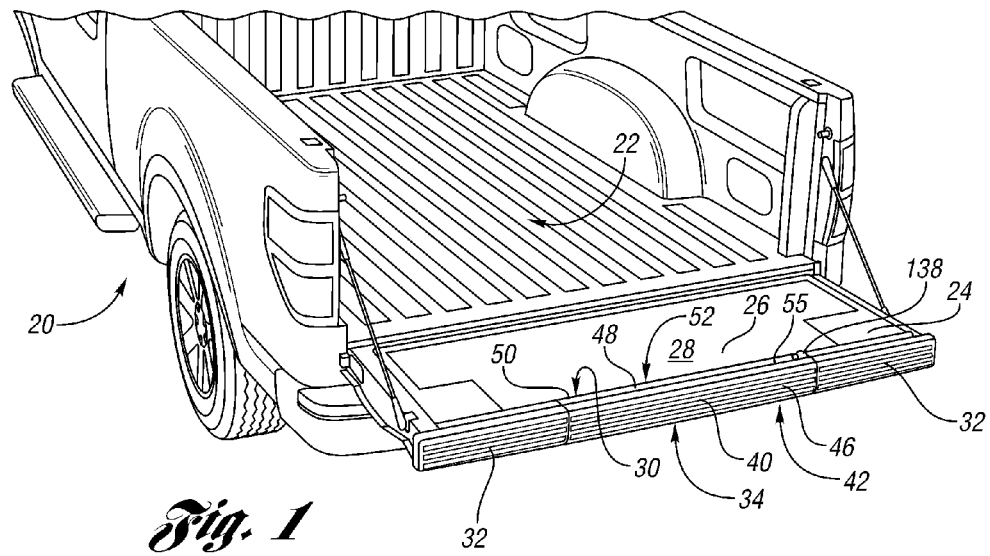
FIG. 1 is a partial rear perspective view of a cargo bed of a vehicle having an open tailgate with a deployable ladder in a stowed position.
Figure 2:
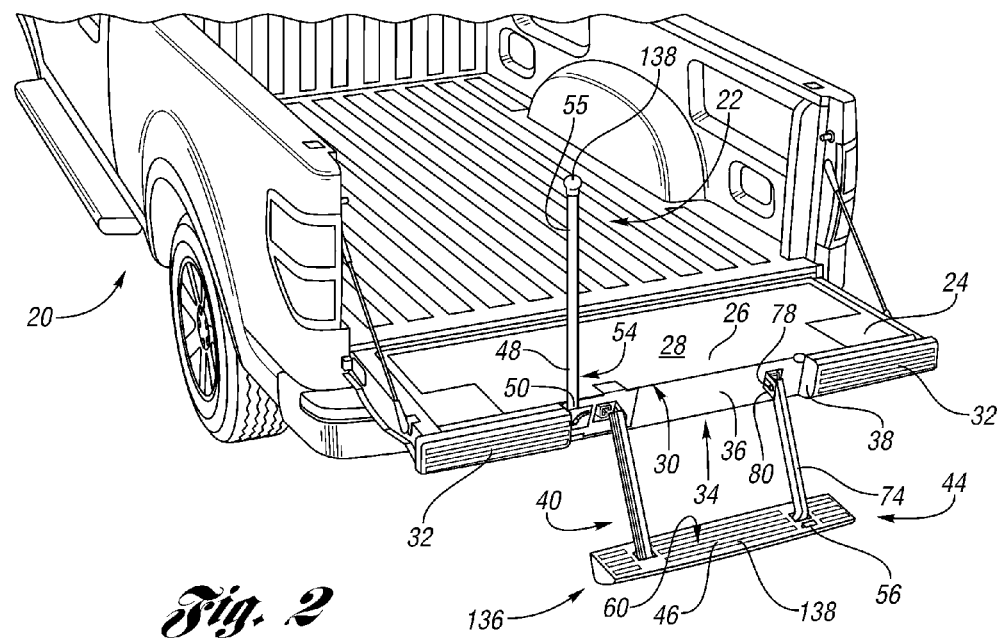
FIG. 2 is a partial rear perspective view of a cargo bed of a vehicle having an open tailgate with a deployable ladder in a deployed position.

FIGS. 1 and 2 show a partial rear view of a vehicle 20 with a cargo area 22 and an open tailgate 24 for ease of access to the cargo area 22. The illustrated example of a vehicle with such a cargo area is a pickup truck. Other vehicles having a cargo area include, but are not limited to, station wagons, estate cars, sport utility vehicles (SUV), vans, buses, flat-bed trucks, and dump trucks. The apparatus also may be used on unpowered vehicles having a cargo area, such as trailers and wagons. The cargo area 22 of a pickup truck may also be referred to as a bed.

The tailgate 24 is a bottom hinged access door, gate, or hatch, that opens to access the cargo area 22. The tailgate 24 may also be located on the side of the cargo area of the vehicle. The tailgate 24 has a main body section 26 with a bed-side surface 28 and a top edge 30. The tailgate 24 provides two portions of an upper section 32 extending from and cooperating with the main body section 26 to form a ladder pocket 34 (best seen in FIG. 2). The ladder pocket 34 has a base 36 that is defined by the main body section 26 at the top edge 30. The ladder pocket 34 may also have a side wall 38 defined by a portion of the upper section 32 that extends from the main body section 26.

The ladder pocket 34 is configured to selectively receive a portion of a ladder 40. FIG. 1 shows the ladder 40 in a stowed position 42 with the ladder partially disposed within the tailgate 24. The ladder 40 may also be placed in a deployed position 44, as shown in FIG. 2, with the ladder 40 extending downwardly from the tailgate 24. The portion of the ladder 40 that is selectively received by the ladder pocket 34 forms a portion of the upper section 32 of the tailgate 24 when the ladder 40 is in the stowed position 42. The portion of the ladder 40 may be adjacent to and flush with the upper section 32 of the tailgate 24 in the stowed position 42.

A step sub-assembly 46 may be selectively disposed within the ladder pocket 34 and provide the portion of the ladder 40 that forms a portion of the upper section 32 of the tailgate 24. The step sub-assembly 46 may provide a portion of the upper section 32 or the entire upper section 32.

In the illustrated embodiment, two symmetrical portions of upper section 32 extend from the main body section 26 to define the ladder pocket 34 and the ladder 40 is substantially centered within the tailgate 24. In another embodiment, one upper section 32 extends from the main body section 26 to define the ladder pocket 34 and the ladder 40 is connected to the tailgate 24 asymmetrically. In yet another embodiment, no portions of the upper section 32 extend from the main body section 26, and the ladder pocket 34 extends across the entire tailgate 24 with no side walls 38. In this embodiment, the step sub-assembly 46 forms the entire upper section 32 of the tailgate 24 when the ladder 40 is in the stowed position 42.

A handle 48 may be used to hold the ladder 40 in the stowed position 42. Using the handle 48 to secure the ladder 40 in a stowed position 42 eliminates the need for a separate release system to hold the ladder 40 in the stowed position 42. The handle 48 has a proximal end 50 which is pivotally connected to the tailgate 24 at, or near, the top edge 30. The handle 48 has a first position 52 (best seen in FIG. 1) which secures the ladder 40 in the stowed position 42.

The handle 48 may be moved to a second position 54 (best seen in FIG. 2) allowing the ladder 40 to be deployed. The handle 48 moves in a pivoting or rotating motion around the proximal end 50. The handle may have a distal end 55 opposite the proximal end 50. A user may grab and pull the handle at the distal end 55, or along the handle 48 between the proximal and distal ends 50, 55, in a motion away from the tailgate 24 to move the handle 48 into the second position 54. The handle 48 in the second position 54 extends above the tailgate 24. The handle 48 provides a generally vertical stability pole to assist a user when stepping onto the ladder 40 to access the cargo area 22.

The handle 48 in the first position 52 is connected to and extends adjacent to the top edge 30 of the tailgate 24. The handle 48 in the first position 52 may also be substantially flush with the bed-side surface 28 of the tailgate 24. Substantially flush means at or near the same height of the bed surface sufficient enough to allow cargo to be slid in and out of the cargo area 22 across the handle 48 without causing significant snagging or blockage of the cargo. Configuring the handle 48 in such a relationship to the tailgate 24 greatly reduces the occurrence of debris and loose cargo from getting trapped under the handle 48. This configuration greatly reduces potential issues that could be encountered when attempting to pivot the handle 48 from the second position 54 to the first position 52 if debris or loose cargo is between the handle 48 and the tailgate 24.

Referring to FIGS. 3 and 4, diagrammatic side views of the tailgate 24 are shown with the ladder 40 in the stowed position 42 and the deployed position 44, respectively. The handle 48 may be moved into the first position 52 and interlocked with a portion of the ladder 40 when the ladder 40 is in the stowed position 42. A C-shaped catch 56 disposed on the step sub-assembly 46 may be used to interlock with the handle 48. The C-shaped catch 56 may be elastically deformable and provide an interference fit. The handle 48 may be pressed in and out of the C-shaped catch 56. In alternative embodiments, a notch or catch on the ladder 40 may interact either directly or indirectly with the handle 48.

The upper section 32 of the tailgate 24 may provide a spoiler 58 for the vehicle 20 when the tailgate 24 is closed. The step sub-assembly 46 may provide a portion, or all, of the spoiler 58 when the ladder 40 is in the stowed position 42. Spoiler 58 may be an automotive aerodynamic device whose intended design function is to spoil unfavorable air movement across a body of the vehicle 20 when in motion. Spoiler 58, however, does not have to actually accomplish the reduction of unfavorable air; rather the spoiler 58 may only be used to provide an appearance enhancement to the vehicle 20. The spoiler 58 may be attached to the vehicle 20 spaced away from a body panel to allow air flow to pass between the spoiler 58 and the vehicle 20. The spoiler 58 may be attached directly to the body panel or may be a raised portion of a body panel that prevents air flow between the spoiler 58 and the vehicle 20. The spoiler 58, as illustrated, provides a raised surface above the back of the tailgate 24 and is primarily used to improve the appearance of the vehicle 20.

The raised surface shape of the spoiler 58 may provide for a longer step surface 60. The spoiler 58 has a top surface 62 with a length 64 greater than an average thickness 66 of the main body section 26 of the tailgate 24. The average thickness 66 of the main body section 26 may be determined by measuring the cross-sectional thickness of the main body section 26 from the bed-side surface 28 to the outer side surface. The measurements are averages based on the area of the cross-sectional thickness. In an alternative embodiment, the length 64 of the top surface 62 is greater than the greatest thickness 68 of the main body section 26 of the tailgate 24. The step surface 60 is disposed on the step sub-assembly 46 opposite the top surface 62 of the spoiler 58. The step surface 60 may also be disposed at an angle 70 to the top surface 62.

The step surface 60 has a length 72 greater than the average thickness 66 of the main body section 26. In an alternative embodiment, the length 72 of the step surface 60 is greater than the greatest thickness 68 of the main body section 26. In yet another embodiment, the step surface 60 may even have a length 72 longer than that of the length 64 of top surface 62 of the spoiler 58. The step surface 60 may provide a non-collapsible surface with a length 72 of at least 5 inches.

The step surface 60 of the step sub-assembly 46 may be disposed adjacent to the base 36 of the ladder pocket 34 when the ladder 40 is in the stowed position 42. The handle 48 may be disposed between the step sub-assembly 46 and the top edge 30 of main body section 26 of the tailgate 24 when the ladder 40 is in the stowed position 42 and the handle 48 is in the first position 52. Debris and loose cargo is shed from the end of the tailgate 24 at the top edge 30 when the handle 48 is in the second position 54 and the ladder 40 is in the deployed position 44. This configuration reduces the occurrence of debris and loose cargo from interfering with the closing of the ladder 40 into the stowed position 42 as well as the closing of the handle 48 into the first position 52.

The ladder 40 has a ladder rail 74 extending from the step sub-assembly 46 to connect the ladder 40 to the tailgate 24. A rail guide 76 is connected to and disposed on or within the tailgate 24. The rail guide 76 supports the ladder rail 74 when the ladder 40 is in the stowed position 42 (see FIG. 3), and guides the ladder rail 74 out of the tailgate 24 as the ladder 40 is moved to the deployed position 44 (see FIG. 4). A pin 78 may be connected near the end of a ladder rail 74 to cooperate with a ladder catch 80 for stopping and supporting the ladder 40 in the deployed position 44.

FIG. 5 shows one embodiment of the ladder rail 74 as a single unitary piece having a general U-shaped design. The ladder rail 74 has a rung segment 84 and two stringer segments 86 extending from the rung segment 84. In alternative embodiments, a single stringer segment 86 may be used or a plurality of stringer segments 86 may be used. The ladder rail 74 may also be comprised of multiple components, and may have a number of different general shapes. The step sub-assembly 46 is connected to the rung segment 84.

FIG. 6 shows a cross-sectional view of the ladder rail 74 at least partially disposed within a rail guide 76. The ladder rail 74 has a generally C-shaped cross-section and the rail guide 76 has a generally G-shaped cross-section. A portion of the C-shaped cross-section of the ladder rail 74 moveably engages a portion of the G-shaped cross-section of the rail guide 76. The rail guide 76 has a first flange 88 and defines a first slot 90 adjacent the first flange 88. The ladder rail 74 has a second flange 92 and defines a second slot 94 adjacent the second flange 92. The second flange 92 is disposed within the first slot 90 to support the ladder 40 in the stowed position 42. Similarly, the first flange 88 may be disposed in the second slot 94 to support the ladder 40 in the stowed position 42. The ladder rail 74 supports the ladder 40 in the stowed position 42, and allows the ladder rail 74 to slide along the rail guide 76 as the ladder 40 is moved from the stowed position 42 to the deployed position 44.

In an alternative embodiment, a roller wheel (not shown) is connected to the ladder rail 74 and disposed in the first slot 90 of the rail guide 76. The roller wheel rotates along the rail guide 76 down the first slot 90 as the ladder 40 is moved from the stowed position 42 to the deployed position 44. In addition, rattle reducing components may cooperate with the ladder rail 74 and rail guide 76 such as bumpers, bushings, bearings, flanges, springs, tabs, and interference fits at various locations.

Figure 7:
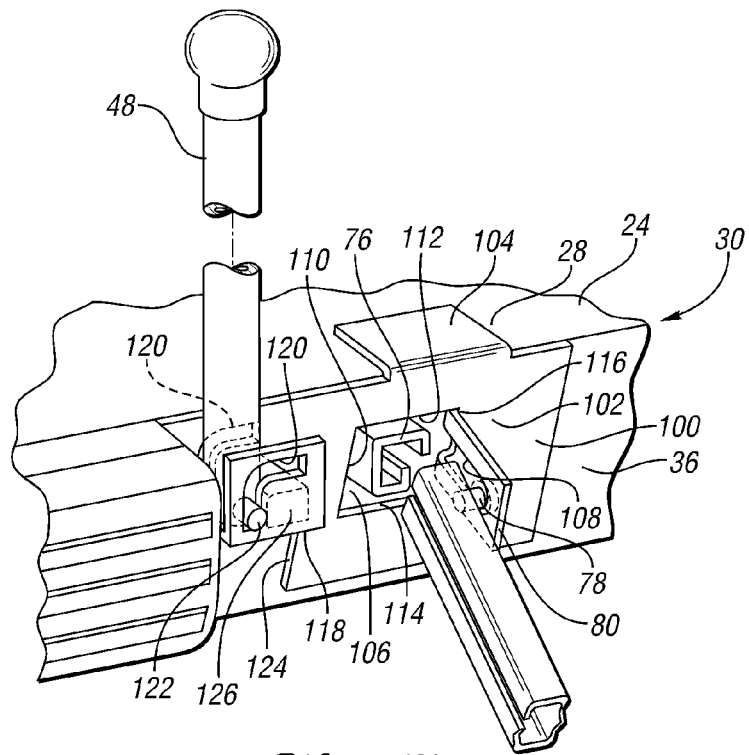
FIG. 7 is a diagrammatic view of a support bracket connected to a top edge of a tailgate with a handle connected to the support bracket through a handle guide and a ladder rail connected to the support bracket through a ladder catch.

FIG. 7 shows one embodiment of a support bracket 100 connected to the tailgate 24 at the top edge 30. The support bracket 100 has a face plate 102 connected to the base 36 of the ladder pocket 34. The support bracket 100 has a bed-side projection 104 connected to and extending away from the face plate 102 along the bed-side surface 28 of the tailgate 24. The bed-side projection 104 provides extra support when the ladder 40 is in the deployed position 44 and weight is placed on the ladder 40.

The support bracket 100 defines a rail hole 106 allowing the ladder rail 74 to pass through the support bracket 100 as the ladder 40 is moved between the stowed and deployed positions 42, 44. The support bracket 100 is connected to the tailgate 24 and the rail hole 106 is disposed adjacent an end of the rail guide 76. In alternate embodiments, the rail guide 76 may be partially disposed within or pass though the rail hole 106. The ladder rail 74 is disposed in the rail hole 106 when the ladder 40 is in the stowed position 42. The ladder rail 74 is disposed outside of the rail hole 106 when the ladder 40 is in the deployed position 44. In an alternative embodiment, the ladder rail 74 remains disposed within the rail hole 106 when the ladder 40 is in the deployed position 44.

The support bracket 100 provides a ladder catch 80. The ladder catch 80 cooperates with the pin 78 to stop and hold the ladder 40 in the deployed position 44. The ladder catch 80 is located adjacent the rail hole 106 opposite the rail guide 76. The ladder catch 80 defines a pin hole 108 for the pin 78 of the ladder 40. The pin 78 is inserted in the pin hole 108 as the ladder 40 is moved into the deployed position 44.

The ladder catch 80 and the rail hole 106 may be formed by cutting three edges 110, 112, 114 of the rail hole 106 and not cutting a fourth edge 116. The pin hole 108 is punched with the three edges 110, 112, 114 of the rail hole 106 while overlapping the fourth edge 116. The ladder catch 80 is formed from the fourth edge 116 of the rail hole 106. The step of cutting the three edges 110, 112, 114 and the step of punching a pin hole 108 may be interchanged or conducted simultaneously. A square rail hole 106 is shown, however a semi-circular or alternate shaped through-hole may be used, and the step of cutting the three edges 110, 112, 114 would be replaced with cutting a portion of the perimeter of the semi-circular or alternate shape to be bent out from the rail hole 106.

The support bracket 100 may also provide a handle shelf 118 that connects the handle 48 to the tailgate 24 and allows the handle 48 to articulate from the first position 52 to the second position 54. The handle shelf 118 defines a handle guide 120 which cooperates with a follower 122 attached to the proximal end 50 of the handle 48. The handle guide 120 is an oblong hole having a generally 90 degree bend near the middle point of the oblong hole. The follower 122 is disposed within the handle guide 120 and follows the oblong hole from end to end as the handle 48 is moved from the first position 52 to the second position 54. The movement of the follower 122 through the handle guide 120 pivots the handle 48 between the first and second positions 52, 54. The support bracket may define two handle guides 120 and the follower 122 may be a single dowel-like piece that passes through both handle guides 120 and the proximal end 50 of the handle 48.

The handle shelf 118 and handle guides 120 may be formed by cutting the face plate 102 of the support bracket 100 creating a peripheral edge 124 and bending the handle shelf 118 up from the face plate 102 on a bend line orthogonal to the peripheral edge 124. A step of punching the handle guide (or guides) 120 may be performed simultaneously or sequentially with the step of cutting the face plate 102. The handle shelf 118 may be bent twice to align the handle guides 120 opposite to and facing each other. The steps of cutting the face plate 102 creating the peripheral edge 124, punching the handle guides 120, cutting the three edges 110, 112, 114, and punching the pin hole 108 may be performed simultaneously or in varying sequential orders.

The above steps may be conducted using an efficient automated process and form a single unitary support bracket 100. Support bracket 100 provides for the handle 48 to be connected to the tailgate 24 at the top edge 30 and reduce the occurrence of debris and loose cargo from being trapped under the handle 48.

The support bracket 100 may also provide, or have attached to it, a positioning member 126. The positioning member 126 is disposed above the handle shelf 118 and is used to hold the handle 48 in its respective first and second positions 52, 54. Positioning member 126 may be cut at an edge and bent up from the face plate 102 or welded into position on the handle shelf 118.

Figure 8:
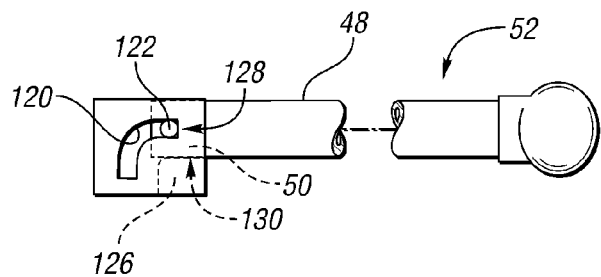
FIG. 8 is a diagrammatic view of a handle in a first position relative to a support bracket handle guide and positioning member.

FIG. 8 shows the handle 48 in the first position 52 with the follower 122 at a first end 128 of the handle guide 120. In this position, the proximal end 50 of the handle 48 contacts a first surface 130 of the positioning member 126. The first surface 130 provides support to the handle 48 holding it in a generally horizontal position regardless of if the handle 48 is interlocked with the ladder 40 or not. The handle 48 pivots off and away from the first surface 130 as the handle 48 is pulled upward and the follower 122 follows the handle guide 120.

The weight of the handle 48 biases the handle 48 to the first surface 130, however a spring (not shown) may also be used to bias the handle 48 against the first surface 130 of the positioning member 126.

Figure 9:
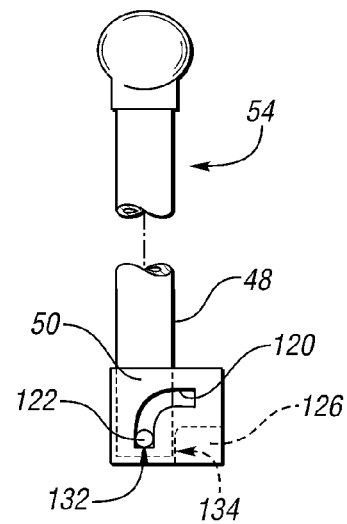
FIG. 9 is a diagrammatic view of a handle in a second position relative to a support bracket handle guide and positioning member.

FIG. 9 shows the handle 48 in the second position 54 with the follower 122 at a second end 132 of the handle guide 120. In this position, the proximal end 50 of the handle 48 contacts a second surface 134 of the positioning member 126. The second surface 134 provides support to the handle 48 holding it in a generally vertical position. The handle 48 may be lifted slightly to allow it to pivot off and away from the second surface 134 to push the follower 122 around the handle guide 120 bend and back into the first position 52. The weight of the handle 48 biases the handle 48 down onto the handle shelf 118 and against the second surface 134. A spring (not shown) may also be used to bias the handle 48 against the second surface 134 of the positioning member 126. A two-position spring may be used to bias the handle 48 in the first position 52 to the first surface 130 and the handle 48 in the second position 54 to the second surface 134.

Various combinations of ladders 40, rail guides 76, support brackets 100 and handles 48 make up a step assembly 136 (best seen in FIG. 2). The above embodiments disclose the step assembly 136 as part of a tailgate 24. The step assembly 136 may also be used on a vehicle without a tailgate (not shown). In this scenario, the rail guides 76 are disposed under the cargo area and the step sub-assembly 46 of the ladder 40 provides a portion of an edge of the cargo area. The handle 48 is used to secure the ladder 40 in a stowed position 42 when the handle 48 is in a first position 52.

The support bracket 100 is connected to the edge of the cargo area or vehicle body member. The handle 48 is connected to an edge of the cargo area by the support bracket 100. The handle 48 may be pivoted to a second position 54, releasing the ladder 40 and allowing the ladder 40 to be moved to a deployed position 44. The ladder 40 extends downwardly from the edge of the cargo area providing a step to access the cargo area. The handle 48 extends upwardly from the edge of the cargo area and provides a generally vertical stability pole to assist a user when stepping on the ladder 40.

In another embodiment, the step assembly 136 may have a glow-in-the-dark portion 138. The glow-in-the-dark portion 138 may be located anywhere on the step assembly 136, with specific examples being that of on the distal end 55 of the handle 48 and the step surface 60 of the ladder 40 (see FIG. 2). Glow-in-the-dark portions 138 may be luminescent or photoluminescent material such as phosphorescent, fluorescent, or radioluminescent materials.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A step assembly for accessing a cargo area of a vehicle comprising:
    a ladder having a stowed position partially disposed within a tailgate and a deployed position extending downwardly from the tailgate when the tailgate is open;
    a handle connected to the tailgate having a first position securing the ladder in the stowed position and a second position extending upwardly from the open tailgate allowing the ladder to be deployed; and
    a support bracket defining a handle guide that cooperates with a follower provided on a proximal end of the handle that pivotally connects the handle to the tailgate and guides the handle between the first position and the second position, the handle guide being an oblong hole having a generally 90 degree bend near a middle point of the oblong hole, and a positioning member disposed adjacent the handle guide, wherein the proximal end of the handle in the first position contacts the positioning member holding the handle in a generally horizontal position.

2. The assembly of claim 1 wherein the proximal end of the handle in the second position contacts the positioning member holding the handle in a generally vertical position and provides a generally vertical stability pole to assist a user when stepping on to the ladder.

3. The assembly of claim 1 wherein the handle in the first position interlocks with a portion of the ladder.

4. The assembly of claim 2 further comprising a spring that biases the handle against the positioning member when the handle is in the second position.

5. The assembly of claim 1 wherein the tailgate has a main body section defining a top edge, the tailgate has a portion of an upper section defined by a step sub-assembly of the ladder when the ladder is in the stowed position, and the handle is connected to the top edge and disposed between the step sub-assembly and the top edge when the ladder is in the stowed position and the handle is in the first position.

6. The assembly of claim 1 wherein the tailgate has a main body section and an upper section extending from the main body section providing a first portion of a spoiler, wherein the tailgate defines a ladder pocket configured to receive a portion of the ladder, wherein the ladder has a step sub-assembly disposed in the ladder pocket in the stowed position that provides a second portion of the spoiler, and wherein the step sub-assembly is configured to provide a non-collapsible step surface of at least 5 inches in length when the ladder is in the deployed position.

7. The assembly of claim 1 wherein the ladder has a ladder rail extending from a step sub-assembly, wherein the ladder rail has a C-shaped cross section.

8. The assembly of claim 7 further comprising a rail guide connected to and disposed within the tailgate, the rail guide having a G-shaped cross-section and supporting the ladder rail with a portion of the C-shaped cross-section moveably engaging the G-shaped cross-section.

9. The assembly of claim 1 further comprising a glow-in-the-dark portion.

10. The assembly of claim 1 further comprising:
    a rail guide fixedly disposed within the tailgate, the rail guide defining a first slot and having a first flange adjacent to the first slot
    the ladder having a rail defining a second slot and having a second flange adjacent the second slot, wherein the second flange of the rail is disposed within the first slot of the rail guide supporting the ladder in the stowed position to allow the ladder to slide out to a deployed position.

11. The assembly of claim 10 wherein the support bracket is connected to a top edge of the tailgate and defining a rail hole located adjacent an end of the rail guide, wherein the rail passes through the support bracket as the ladder is moved from a stowed position in which the rail is partially disposed within the tailgate to a deployed position with the rail extending downwardly from the tailgate when the tailgate is open, and wherein the support bracket provides a ladder catch adjacent the rail hole for catching and holding the ladder in the deployed position, and further comprising a pin located at an end of the rail that cooperates with the catch to stop and hold the ladder in the deployed position.

12. The assembly of claim 10 wherein the tailgate has a main body section and a portion of an upper section extending from the main body section, and the ladder has a step sub-assembly that in combination with the portion of the upper section of the tailgate extending from the main body section defines a spoiler, wherein the spoiler has a top exterior surface having a greater width than a thickness of the main body section, and the step sub-assembly provides a non-collapsible step surface disposed opposite the top exterior surface at an angle, wherein the non-collapsible step surface has a length longer than the thickness of the main body section of the tailgate.

13. A tailgate comprising:
a main body section and a spoiler extending from the main body section having at least one fixed portion and one moveable portion; and
a ladder having a step sub-assembly providing the moveable portion of the spoiler, wherein the step sub-assembly provides a non-collapsible step surface that is longer than an average thickness of the main body section;
a handle connected to the tailgate wherein in the handle in a first position holds the ladder in a stowed position, and wherein the handle is pivotable to a second position to extend the tailgate to a deployed position; and
a support bracket connected to the main body section of the tailgate configured to support a portion of the ladder in the deployed position, pivotally connecting the handle to the tailgate, and providing support for the handle to be used as a vertical stability pole to assist a user when stepping on to the ladder.

14. The tailgate of claim 13 wherein the length of the step surface is at least 5 inches.

15. A tailgate comprising:
a handle having a first position securing a ladder within the tailgate and a second position allowing the ladder to be deployed; and
a support bracket configured to support a portion of the ladder when deployed, pivotally connect the handle to the tailgate, and support the handle in the second position to be used as a vertical stability pole to assist a user when stepping on to the ladder.

16. The tailgate of claim 15 wherein the support bracket defines a handle guide that cooperates with a follower provided on a proximal end of the handle that pivotally connects the handle to the tailgate and guides the handle between the first position and the second position, the handle guide being an oblong hole having a generally 90 degree bend near a middle point of the oblong hole, and a positioning member disposed adjacent the handle guide.

17. The tailgate of claim 16 wherein the proximal end of the handle in the first position contacts the positioning member holding the handle in a generally horizontal position.

18. The tailgate of claim 17 wherein the handle in the first position interlocks with a portion of the ladder.

19. The tailgate of claim 16 wherein the proximal end of the handle in the second position contacts the positioning member holding the handle in a generally vertical position.

20. The tailgate of claim 19 further comprising a spring that biases the handle against the positioning member when the handle is in the second position.

* * * * *